United States Patent [19]

Maeda

[11] Patent Number: 5,796,686

[45] Date of Patent: Aug. 18, 1998

[54] TRACK JUMP CONTROL APPARATUS FOR DISC REPRODUCING SYSTEM

[75] Inventor: Satoru Maeda, Saitama-ken, Japan

[73] Assignee: Kabushiki Kaisha Toshiba, Kawasaki, Japan

[21] Appl. No.: 862,956

[22] Filed: Jun. 2, 1997

Related U.S. Application Data

[63] Continuation of Ser. No. 522,114, Aug. 31, 1995, abandoned.

[30] Foreign Application Priority Data

Sep. 1, 1994 [JP] Japan ................................. 6-208725

[51] Int. Cl.$^6$ ................................................. G11B 7/085
[52] U.S. Cl. ............................... 369/44.28; 369/44.32; 369/54
[58] Field of Search ......................... 369/44.28, 44.32, 369/54, 58

[56] References Cited

U.S. PATENT DOCUMENTS

5,459,705 10/1995 Matoba et al. ................. 369/44.28 X
5,473,587 12/1995 Hamaguchi et al. ............... 369/44.28
5,493,550 2/1996 Sohmuta ..................... 369/44.28 X
5,515,349 5/1996 Yamazaki et al. ................. 369/44.28

*Primary Examiner*—W. R. Young
*Attorney, Agent, or Firm*—Cushman Darby & Cushman IP Group of Pillsbury Madison & Sutro LLP

[57] ABSTRACT

A track jump control apparatus for a disc reproducing system having a transport unit for moving a pickup element that reads data recorded on the disc in the radial direction of the disc at a high speed. The system also has a detecting unit for detecting a moving direction of the pickup element unit based on a pick-up signal output from the pickup element while the pickup element moves in the radial direction of the disc, and a protection unit for stopping the pickup element moved by the transport unit when the pickup element is judged to be moving in a different direction from the direction moved by the transport unit. The apparatus has a measuring unit for measuring a pulse duration of the picked-up signal, which is continuously obtained from the pickup element while the pickup element moves in the radial direction of the disc at a high speed. The apparatus also has a control unit for inverting a detected result of the detecting unit when the pulse duration of the picked-up signal is beyond a specific limit based on the measured result of the measuring unit.

9 Claims, 8 Drawing Sheets

TRACK JUMP CONTROL APPARATUS FOR DISC REPRODUCING SYSTEM

This is a continuation of application Ser. No. 08/522,114, filed on Aug. 31, 1995, which was abandoned.

FIELD OF THE INVENTION

The present invention relates to a disc reproducing system such as a CD-ROM (Compact Disc Read Only Memory) drive, and more particularly, to an improvement of the track jump control apparatus for establishing a high speed track search capability.

BACKGROUND OF THE INVENTION

As is well known in the art, an optical disc reproducing system includes a high speed track search feature for searching for desired date rapidly out of an enormous amount of data recorded on the disc and reproducing the desired data. The high speed track search feature (for example, track jump operation) is realized by driving the optical pickup across tracks in the radial direction of the disc to a target track where the desired data is recorded.

In this case, the disc reproducing system detects an actual moving direction of a beam spot irradiated on the disc while the track jump operation is carried out.

However, because of such things as disc eccentricity or an acceleration given to the optical pickup from outside, the optical pickup is not always moving in the radial direction of the disc. And, when it is determined that the optical pickup is moving in the direction opposite to the desired radial direction, which results by the detection of the moving direction of the beam spot, the track jump operation is terminated promptly with the belief that the conditions are not suitable for the track jump operation.

Figure 3:
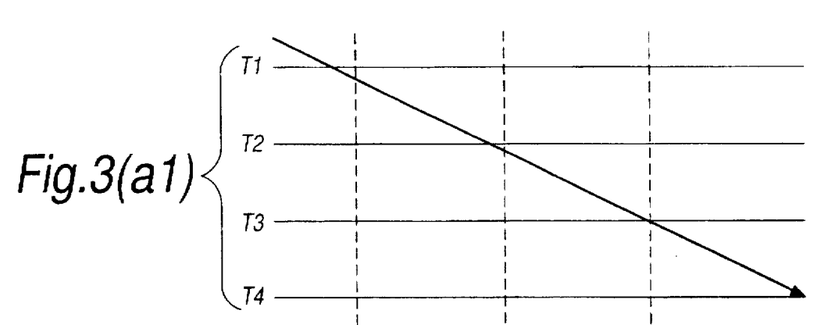

The charts of FIGS. 3(a1), 3(a2), 3(b1), 3(b2), 3(c1), 3(c2), 3(d1), 3(d2), 3(e1), 3(e2), 3(f1), and 3(f2) were obtained using detecting means for detecting the moving direction of the beam spot during the track jump operation. First, during that operation the beam spot is crossing on the disc in the order of tracks T1, T2, T3 and T4, as shown by the arrow in FIG. 3(a1), an RF (high frequency) signal, as shown in FIG. 3(b1), is output from the optical pickup and an envelope, as shown in FIG. 3(c1), is extracted. Further, a tracking error signal, as shown in the FIG. 3(d1), is then obtained.

And, by slicing the level of the envelope and track error signal in the middle between the maximum level and the minimum level, rectangular pulse train signals, as shown in FIGS. 3(e1) and 3(f1), are developed. From the relative phase shift directions of both rectangular pulse train signals the moving direction of the beam spot is detected.

Figure 4:
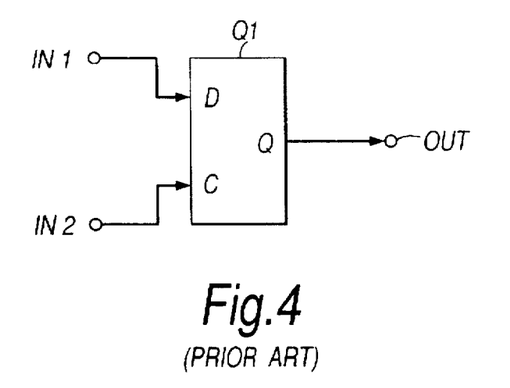
FIG. 4 is a block diagram showing a conventional detecting means for carrying out the detection of the beam spot moving direction.

For example, the rectangular pulse train signal, as shown in FIG. 3(f1), is supplied to the data input terminal D of a D-FF (delay type flip flop) circuit Q via an input terminal IN1, as shown in FIG. 4. The rectangular pulse train signal, as shown in FIG. 3(e1), is supplied to the clock input terminal C of the D-FF circuit Q via an input terminal IN2. A rectangular pulse train signal, as shown in FIG. 3(f1), is latched by a rising edge of the rectangular pulse train signal, as shown in the same FIG. 3(e1), so that the H (high) level detected signal for showing that the beam spot is moving in proper direction on the disc is output from an output terminal OUT.

On the other hand, when the beam spot is traversing the disc in the order of tracks T4, T3, T2 and T1, as shown by the arrow in FIG. 3(a2), an RF (high frequency) signal, as shown in FIG. 3(b2), is output from the optical pickup and an envelope, as shown in FIG. 3(c2), is extracted. Further, in this state, a tracking error signal, as shown in FIG. 3(d2), is obtained.

By slicing the level of the envelope and tracking error signal in the middle between the maximum level and the minimum level, rectangular pulse train signals, as shown in FIGS. 3(e2) and 3(f2), are developed. So that, by the D-FF unit Q1 mentioned above, the rectangular pulse train signal, as shown in FIG. 3(f2), is latched by a rising edge of the rectangular pulse train signal, as shown in FIG. 3(e2), so as to obtain an L(low level) detected signal for showing that the beam spot is moving in negative direction on the disc from on output terminal OUT.

Figure 5A:
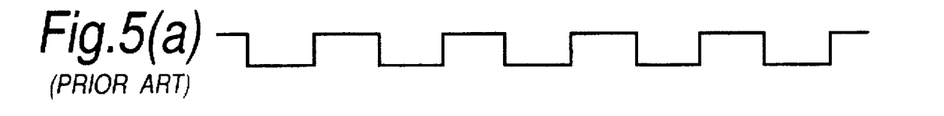
FIGS. 5(a) to 5(c) are diagrams for explaining the problem in the conventional system of FIG. 4.
Figure 5B:
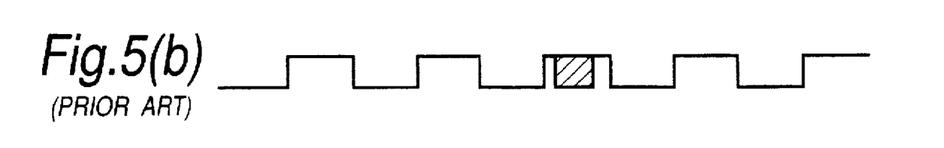
Figure 5C:
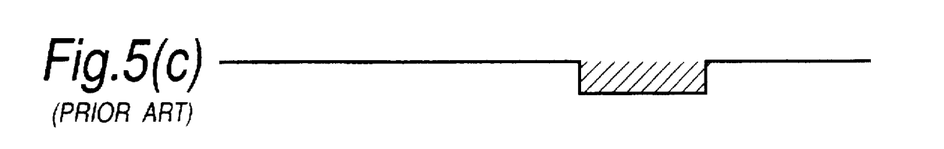

However, during detection of the moving direction of the beam spot, the rectangular pulse train signal, as shown in FIG. 5(b), is latched by the rising edge of the rectangular pulse train signal, as shown in FIG. 5(a), so as to obtain the H level detected signal, as shown in FIG. 5(c). This kind of moving direction detecting means, as mentioned above, generates a wrong detected signal of the L level, as shown by the shading in FIG. 5(c). Although the beam spot may be moving in the proper direction, when a noise as shown in the shading in FIG. 5(b) is mingled with the rectangular pulse train signal, at the point where the edge of the rectangular pulse train signal rises, as shown in FIG. 5(a), which can be caused by a flaw on the disc and so on, the track jump operation is terminated.

In other words, the detecting means as mentioned above is susceptible to incorrect detection due to its low detection frequency. In addition, the detecting means operates to detect the moving direction of the beam spot by making only one judgement for the level of one of the rectangular pulse train signal at the rising edge of the other every time the beam spot traverses the tracks.

For determining a relative phase shift direction between two rectangular pulse train signals, it is better to use four judging results every time the beam spot traverses the tracks. Two of these judging results are obtained by determining the level of a first one of the rectangular pulse train signal at the rising and falling edges of the other. The other two judging results are obtained by determining the level of the other rectangular pulse train signal at the rising and falling edges of the first one of the rectangular pulse train signal. These four judging results are used for generating a signal indicating the moving direction of the beam spot only when all of the four judging results agree with each other.

Figure 6:
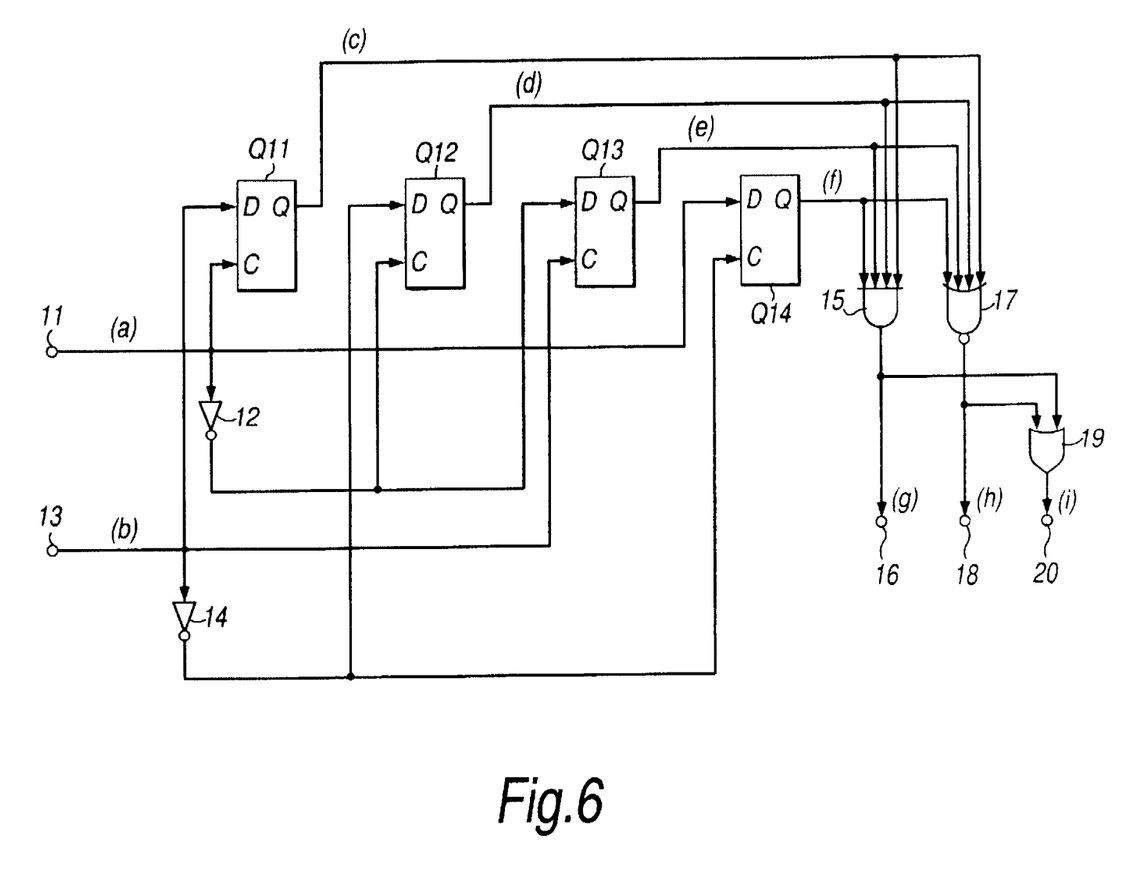
FIG. 6 is a block diagram showing an improved arrangement of a beam spot moving direction detection means.
Figures 7A, 7I:
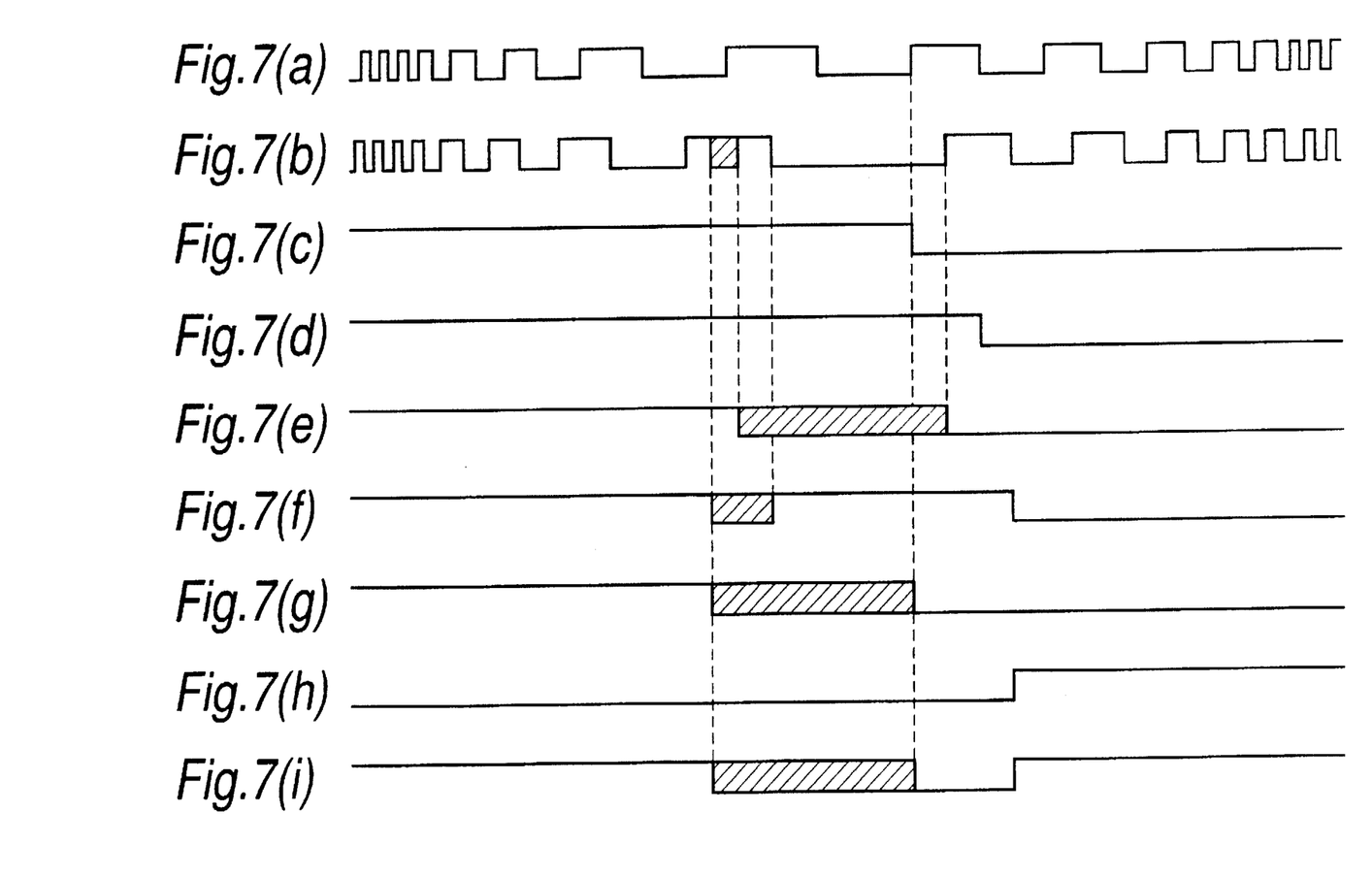

FIG. 6 shows an improved beam spot moving direction detecting means. A rectangular pulse train signal, as shown in FIG. 7(a), which is developed from the envelope of the RF signal, is supplied to an input terminal 11. The rectangular pulse train signal introduced to the input terminal 11 is supplied to the clock input terminal C of the D-FF unit Q11 and the data input terminal D of the D-FF unit Q14, at the same time it is supplied to both the clock input terminal C of the D-FF unit Q12 and the data input terminal D of the D-FF unit Q13 via a NOT gate 12.

Further, a rectangular pulse train signal, as shown in FIG. 7(b), which is developed from the tracking error signal, is supplied to the input terminal 13. The rectangular pulse train signal introduced to the input terminal 13 is supplied to the data input terminal D of the D-FF unit Q11 and the clock input terminal C of the D-FF unit Q13, at the same time it is supplied to the clock input terminal C of the D-FF unit Q12 and the clock input terminal C of the D-FF unit Q14 via a NOT gate 14. The latched results, as shown in FIGS. 7(c), 7(d), 7(e) and 7(f), are output from the output terminals Q of the D-FF units Q11, Q12, Q13 and Q14, respectively.

By supplying the outputs of the D-FF units Q11, Q12, Q13 and Q14 to a four-input AND gate 15, a judging result, as shown in FIG. 7(g), is obtained from a first output terminal 16. The judging result g indicates that the beam spot is traversing the tracks on the disc in the positive direction (outward direction of the disc) when it is a high (H) level. The judging result g indicates that the beam spot is traversing the tracks on the disc in the negative direction (inward direction of the disc) when it is a low (L) level. Further, by supplying the outputs of each D-FF units to a four-input NOR gate 17, a judging result, as shown in FIG. 7(h), is obtained from the second output terminal 18. This judging result h also indicates that the beam spot is traversing the tracks on the disc in the positive direction (outward direction of the disc) when it is a H level. The judging result h indicates that the beam spot is traversing the tracks on the disc in the negative direction (inward direction of the disc) when it is a L level.

The output g of the four-input AND gate 15 and the output h of the four-input NOR gate 17 are supplied to a two-input OR gate 19. A judging result, as shown in FIG. 7(i), is output from a third output terminal 20. The judging result indicates that the judging results obtained from the output terminals 16 and 18 are correct when it is a H level. The judging result indicates that when it having the L level the judging results obtained from the output terminals 16 and 18 are incorrect when it is a L level.

With the improved beam spot moving direction detecting means, when a noise is mingled with a rectangular pulse train signal, as shown by the shading in FIG. 7(b), and is processed though the detecting means, as shown by the shadings in FIGS. 7(e), 7(f), 7(g) and 7(i), the outputs of the D-FF units Q13, Q14, the four-input AND gate 15 and the two-input OR gate 19 are uncertain. The output of the four-input NOR gate 17, however, does not have this uncertainty, as shown in FIG. 7(h), and thus is able to prevent the malfunction of the track jump operation.

Figure 8A:
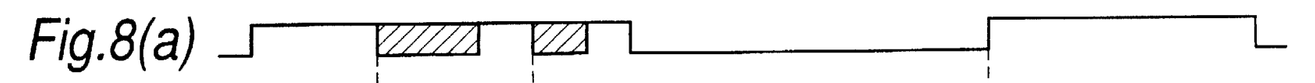
Figure 8B:
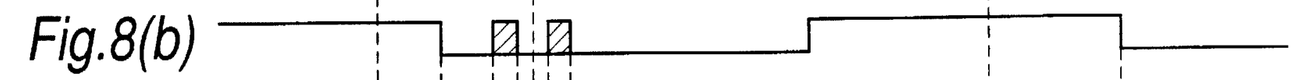
Figure 8C:
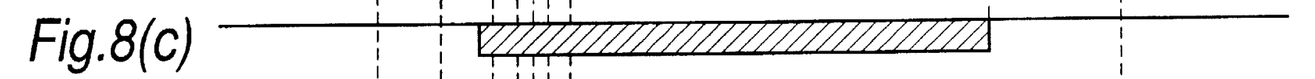
Figure 8D:
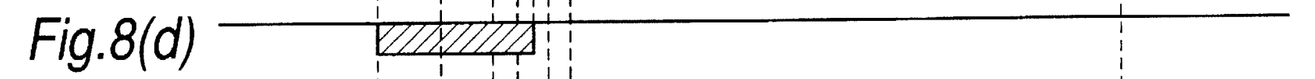
Figure 8E:
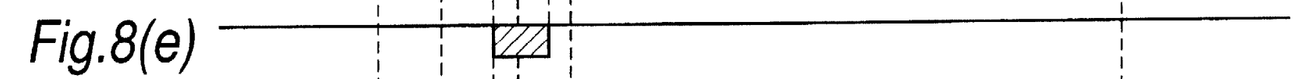
Figure 8F:
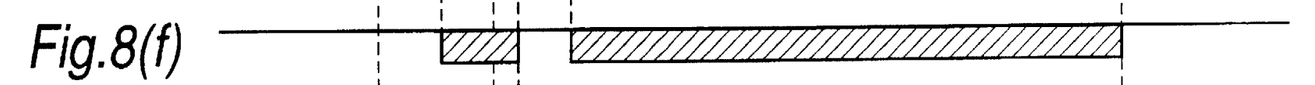
Figure 8G:
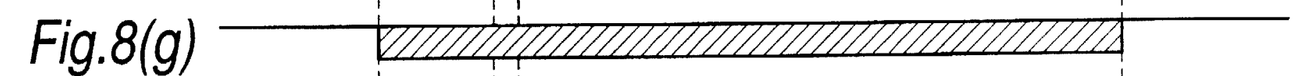
Figure 8H:
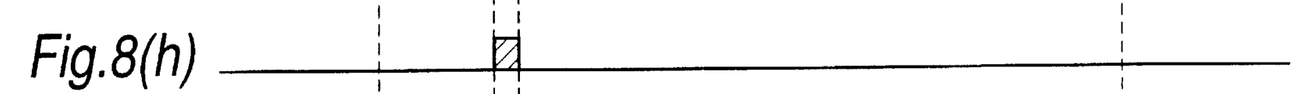
Figure 8I:
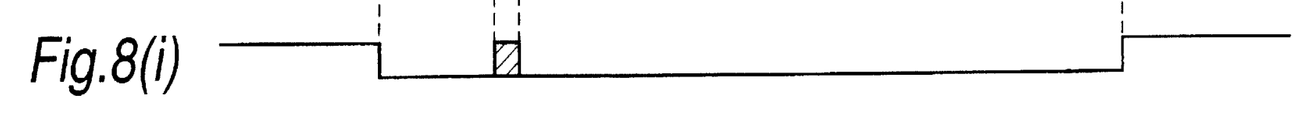

However, with the detecting means mentioned above, when noises are mingled with a rectangular pulse train signal developed from the envelope of the RF signal and a rectangular pulse train signal developed from the tracking error signal, as shown by the shadings in FIGS. 8(a) and 8(b) incorrect detection may still occur.

As described above, the conventional track jump control apparatus for the disc reproducing system has a drawback in that the conventional beam spot moving direction detecting means can make incorrect detections even though the beam spot is moving in the proper direction. This occurs when a noise is mingled with the rectangular pulse train signal that is sued for detecting the relative phase shift direction, and thus causes the termination of the track jump operation.

SUMMARY OF THE INVENTION

Accordingly, the present invention has been made in view of the problems shown above and it is the object of the present invention to provide and extremely reliable track jump control apparatus for disc reproducing systems that does not stop the track jump operation carelessly even though a noise has been mingled with each rectangular pulse train signals.

In order to achieve the above object, a track jump control for the disc reproducing system according to one aspect of the present invention includes transport means for moving a pickup element that reads data recorded on the disc in the radial direction of the disc at a high speed, detecting means for detecting a moving direction of the pickup element based on a picked-up signal output from the pickup element. While the pickup element moves in the radial direction of the disc at a high speed by the transport means, and protection means for stopping the pickup element moved by the transport means when the pickup element is judged to be moving in a different direction from the moving direction caused by the transport means. And, it is also provided with measuring means for measuring a pulse duration of the picked-up signal, which is continuously obtained from the pickup element while the pickup element moves in the radial direction of the disc at a high speed, and control means for inverting a detected result of the detecting means to the protection means when the pulse duration of the picked-up signal is beyond a specific limit.

In the construction as described above, the present invention, which is constructed to continuously measure a picked-up signal output from the pickup element while the pickup element moves in the radial direction of the disc at a high speed, and to invert a detected result of the detecting means by the protection means when the pulse duration of the picked-up signal is beyond a specific limit, prevents the track jump from being erroneously stopped even though noises are mingled with each rectangular pulse train signal that is used for determining the relative phase shift direction.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 3(a1), 3(a2), 3(b1), 3(b2), 3(c1), 3(c2), 3(d1), 3(d2), 3(e1), 3(e2), 3(f1), and 3(f2) are diagrams for explaining a conventional method of determining the beam spot moving direction;

FIGS. 7(a) to 7(i) are diagrams for explaining the operation of the improved arrangement of FIG. 6; and FIGS. 8(a) to 8(i) are diagrams for explaining a problem still remaining in the operation of the improved arrangement of FIG. 6.

DESCRIPTION OF THE PREFERRED EMBODIMENTS

Figure 1:
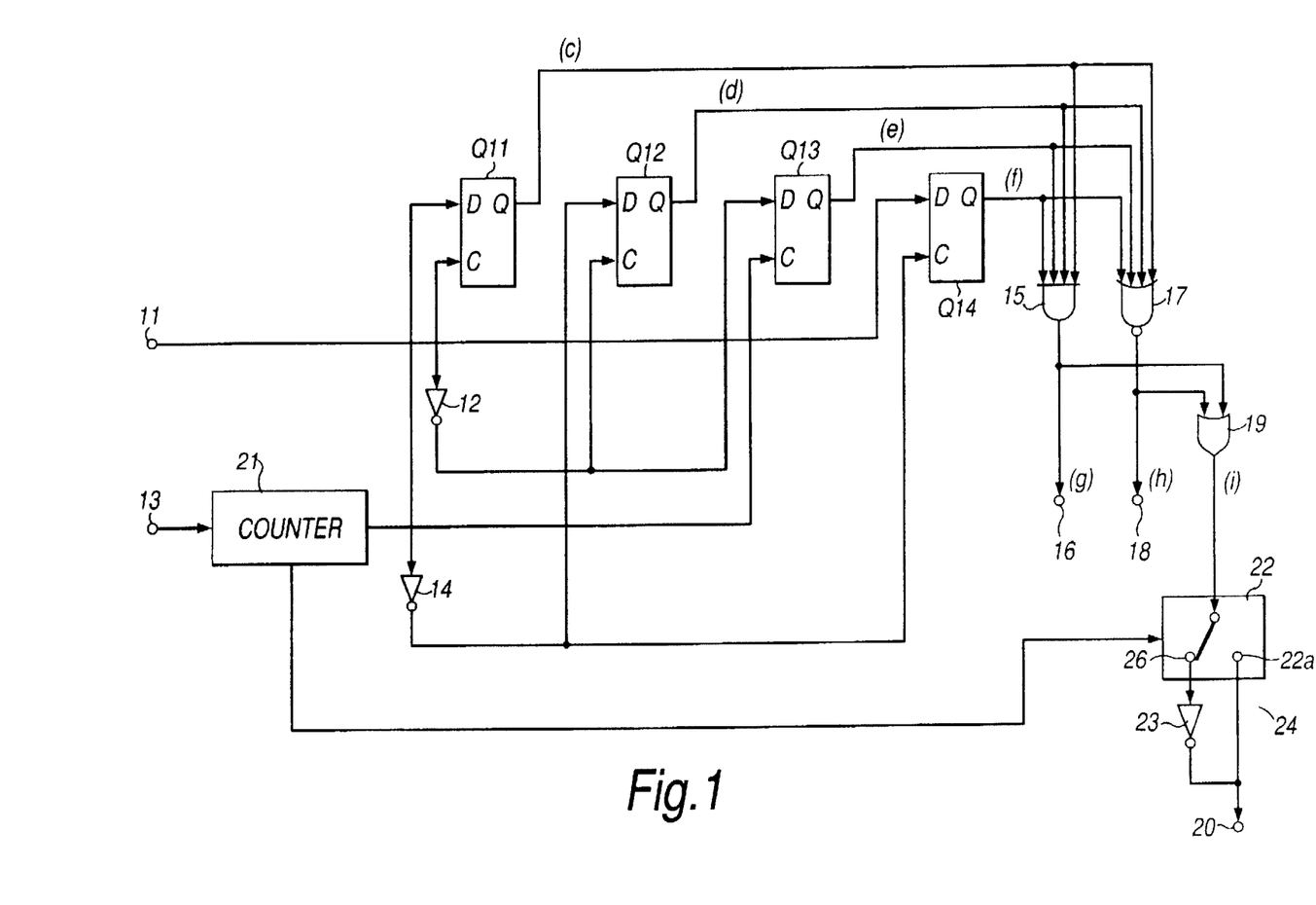
FIG. 1 is a block diagram showing a beam spot moving direction detection means of a track jump control apparatus for the disc reproducing system according to the present invention.
Figure 2A:
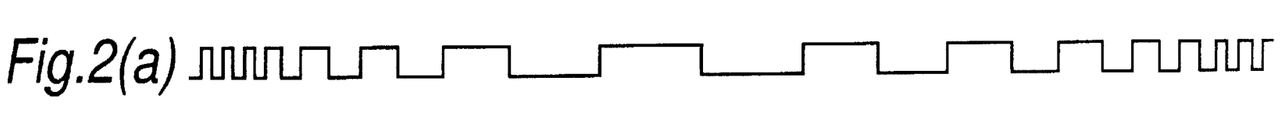
FIGS. 2(a) and 2(b) are diagrams showing two rectangular pulse train signals provided for explaining the operation of FIG. 1.
Figure 2B:
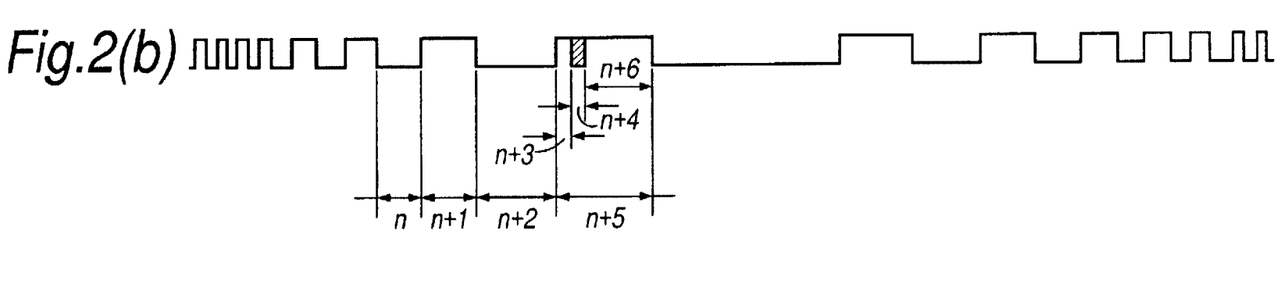

Referring now to FIGS. 1 and 2(a) and 2(b), a preferred embodiment of a beam spot moving direction detection means according to the present invention will be explained. FIG. 1 shows a block diagram of a beam spot moving direction detection means according to the present invention. FIGS. 2(a) and 2(b) shows two types of rectangular pulse train signals provided for explaining the operation of FIG. 1. In FIG. 1, a first input terminal 11 is supplied with a rectangular pulse train signal that is developed from the envelope of an RF signal. While a second input terminal 13 is supplied with another rectangular pulse train signal that is developed from a tracking error signal. The envelope-based rectangular pulse train signal introduced on the first input terminal 11 is supplied to either the data input terminals D or the clock input terminals C of first through fourth D-FF units Q11–Q14, directly or via a first NOT gate 12. In particular, the envelope-based rectangular pulse train signal is directly supplied to both the clock input terminal C of the first D-FF unit Q11 and the data input terminal D of the fourth D-FF unit Q14. The envelope-based rectangular pulse train signal is also supplied to both the clock input terminal C of the second D-FF unit Q12 and the data input terminal D of the third D-FF unit Q13, via the first NOT gate 12.

The tracking error signal-based rectangular pulse train signal, as shown in FIG. 2(b), that is introduced on the second input terminal 13 is supplied to a counter the 21. The counter 21 then measures the pulse duration of each of the positive and negative pulses of the tracking error signal-based rectangular pulse train signal. Further, the tracking error signal-based rectangular pulse train signal is supplied to the data input terminals D or the clock input terminals C of first through fourth D-FF units Q11–Q14, directly or via a second NOT gate 14. In particular, the tracking error signal-based rectangular pulse train signal is directly supplied to both the data input terminal D of the first D-FF unit Q11 and the clock input terminal C of the third D-FF unit Q13. The tracking error signal-based rectangular pulse train signal is also supplied to both the data input terminal D of the second D-FF unit Q12 and the clock input terminal C of the fourth D-FF unit Q14 via the second NOT gate 14. The latched results, as shown in FIGS. 7(c), 7(d), 7(e) and 7(f), are output from the output terminals Q of the first through fourth D-FF units Q11, Q12, Q13 and Q14, respectively.

By supplying the outputs Q of the first through fourth D-FF units Q11, Q12, Q13 and Q14 to a four-input AND gate 15, a judging result, as shown in FIG. 7(g), is obtained from a first output terminal 16. The judging result g indicates that the beam spot is traversing the tracks on the disc in the positive direction (outward direction of the disc) when it is a H level. The judging result g indicates that the beam spot is traversing the tracks on the disc in the negative direction (inward direction of the disc) when it is a L level. Further, by supplying outputs Q of each of the first through fourth D-FF units Q11, Q12, Q13 and Q14 to a four-input NOR gate 17, another judging result, as shown in FIG. 7(h), is obtained from a second output terminal 18. This judging result h also indicates that the beam spot is traversing the tracks on the disc in the positive direction (outward direction of the disc) when it is a H level. The judging result h indicates that the beam spot is traversing the tracks on the disc in the negative direction (inward direction of the disc) when it is a L level.

Upon the output g of the four-input AND gate 15 and the output h of the four-input NOR gate 17 being supplied to a two-input OR gate 19, a judging result, as shown in FIG. 7(i), is output from the output of the two-input OR gate 19. The judging result i indicates that the judging results obtained from the output terminals 16 and 18 are correct when it is a H level. The judging result i indicates that the judging results obtained from the output terminals 16 and 18 are incorrect when it is a L level.

The compensated judging result i will not be deteriorated by noise, even if the noise is mingled with either the envelope-based rectangular pulse train signal introduced on the first input terminal 11 or the tracking error signal-based rectangular pulse train signal introduced on the second input terminal 13. Thus the compensated judging result i allows the apparatus a correct track jump operation without being affected by noise. However, when both the envelope-based rectangular pulse train signal and the tracking error signal-based rectangular pulse train signal are deteriorated by noise, as shown in FIGS. 8(a) to 8(i), even the compensated judging result i obtained from the two-input OR gate 19 will be affected, as shown by the shading in FIG. 8(i). Thus the compensated judging result i will still be uncertain when both the envelope-based rectangular pulse train signal and the tracking error signal-based rectangular pulse train signal are deteriorated by noise.

The present invention overcomes the problem remaining in the compensated judging result i as follows. The compensated judging result i is forwarded to a controller 24, which comprises a switch 22 and a third NOT gate 23. As stated below, the controller 24 is controlled by the counter 21.

Returning now to FIG. 1, the counter 21 successively measures the pulse durations of the positive and negative pulses of the tracking error signal-based rectangular pulse train, as shown in FIG. 2(b). The measurement is achieved by use of a reference clock with a fixed pulse duration is reset and counted at the time the polarity of the tracking error signal-based rectangular pulse train signal reverses, as shown in FIG. 2(b).

The measuring results are provided for calculation of ratios between the pulse durations of two consecutive positive and negative or negative and positive pulses. Then the calculated ratio is also monitored in the counter 21 to determine whether the ratio remains in a prescribed range or not. In particular, the counter 21 monitors whether a sudden change of the pulse duration in the tracking error signal-based rectangular pulse train has occurred. When such a sudden change occurs, information indicating the sudden change is supplied to the controller 24.

When the tracking error signal-based rectangular pulse train signal is not affected by noise, the pulse durations calculated by the counter 21 from the successive positive and negative pulses of the tracking error signal-based rectangular pulse train signal changes from n to n+1 to n+2 to n+5 . . . , as shown in FIGS. 2(a) and 2(b). In the normal state not deteriorated by noise, the ratios between two successive pulses obtained at the respective polarity change of the pulses of the tracking error signal-based rectangular pulse train signal (i.e., n/(n+1), (n+1)/(n+2), (n+2)/(n+5), . . . ) varies gently without exceeding a prescribed range. This is true for when the movement of the beam spot is either accelerated or decelerated.

When the ratio of the two successive pulse durations is gently varying within the prescribed range (i.e., the pulse delation does not suddenly change) the switch 22 is controlled by the information from the counter 21 so as to select a first terminal 22a for a direct connection to a third output terminal 20, and thus causing the compensated judging result i to be directly output through the third output terminal 20. As a result, the judging result i through the direct connection made by the controller 24, correctly represents the beam spot moving direction.

On the other hand, when any noise mingles in the tracking error signal-based rectangular pulse train signal, as shown in FIG. 2(b), the pulse durations calculated by the counter 21 from the successive positive and negative pulses of the tracking error signal-based rectangular pulse train signal change to n, n+1\ n+2\, n+3\ n+4\ n+6 . . . (see FIGS. 2(a) and 2(b)). In this abnormal state deteriorated by noise, the ratios between two successive pulses obtained at the respective polarity change of the pulses of the tracking error signal-based rectangular pulse train signal are n/(n+1), (n+1)/(n+2), (n+2)/(n+3), (n+3)/(n+4), (n+4)/(n+6) . . . . The ratio (n+2)/(n+3) represents an extremely large value that is above the upper limit of the prescribed range. Similarly, the ratio (n+4)/n+6) represents an extremely small value that is below the lower limit of the prescribed range. Thus, the counter 21 monitors that the pulse durations around the noise has suddenly changed.

Accordingly, when the ratios between two successive pulses obtained at the respective polarity change of the pulses of the tracking error signal-based rectangular pulse train signal have varied beyond the prescribed range, it is considered that the sudden change of the pulse duration is caused by noise. Then the information representing the sudden change of the pulse duration is used to select a second terminal 22b for an indirect connection through the third NOT gate 23 to a third output terminal 20 thus causing the polarity of the compensated judging result i to be reversed and then output from the third output terminal 20. As a result, the polarity of the judging result i during the deterioration by the noise is reversed so that it can be used as a signal correctly representing the beam spot moving direction. Accordingly, if the four-input AND gate 15 or the four-input NOR gate 17 were output erroneous detection signal, the final judging result obtained on the third output terminal 20 is still able to correctly control the track jump operation.

As described above, the system for driving the optical pickup itself or its object lens in the radial direction of the disc, (i.e., the mechanical drive such as the pickup feed motor or the tracking actuator) moves the optical pickup or the object lens based on a finite electric input. The acceleration or deceleration of this system also has a finite value. Thus, a sudden velocity change over prescribed limits of the acceleration or deceleration or a sudden change of the moving direction of the pickup never occurs.

Thus, when the ratio of two successive pulse durations around the polarity change of the rectangular pulse train signal varies beyond a prescribed range, the system according to the present invention may judge that it is erroneously caused by noise. In other words, the system of the present invention disregards detection results that erroneously indicate that the pickup moving direction has changed. This is obtained by the combination of the counter 21 and the controller 24. The system of the present invention is able to prevent the erroneous operation for terminating the track jump even when the detection signal is affected by noise.

Here, in the above explanation of the embodiment, the pulse durations of the tracking error signal-based rectangular pulse train signal is measured by counting a reference clock with a constant frequency for the pulse duration. However it is also capable of counting time by resetting every time the polarity of the pulse train signal. In this case, when the ratio of the pulse durations has suddenly changed, the system of the present invention may judge that it is caused by noise. Then, the system of the present invention is able to prevent the erroneous termination of the track jump, even though the detection signal erroneously indicates a change in the direction of the pickup movement from its expected direction.

Further, the pulse duration of the envelope-based rectangular pulse train signal, as shown in FIG. 2(a), can also be used. In the case of the envelope-based rectangular pulse train signal, the counter 21 is coupled to the first input terminal 11 instead of second input terminal 13.

Furthermore, it is most preferable that such counters as the counter 21 are coupled to both the first and second input terminals 11 and 13, and thus the counters monitor the sudden change of the pulse durations in the envelope-based rectangular pulse train signal and the tracking error signal-based rectangular pulse train signal.

The present invention is not limited to the above embodiment and is also adapted for many applications without departing from the principle of the present invention.

The present invention provides an extremely advantageous track jump control apparatus for the disc reproducing system, which is able to avoid an erroneous termination of the track jump operation, even though noise has mingled with both or either of two rectangular pulse train signals that are used for determining the relative phase shift direction.

As described above, the present invention can provide an extremely advantageous track jump control apparatus for disc reproducing system.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A track jump control apparatus for a disc reproducing system, the disc reproducing system including transport means for transporting, in the radial direction of a disc, a pickup element that reads data that has been recorded on the disc, detecting means for detecting, based on a picked-up signal output from the pickup element, a direction in which the pickup element is moving, and protection means for performing an operation that causes the movement of the pickup element to stop when it is determined that the direction of movement of the pickup element is opposite to an expected moving direction, the track jump control apparatus comprising:

measuring means for successively measuring pulse durations of the picked-up signal; and wherein the protection means includes control means responsive to the measured result for preventing the protection means from causing the movement of the pickup element to stop when the ratio of pulse durations of two successive opposite polarity output signals has varied from a prescribed range.

2. A track jump control apparatus as recited in claim 1, wherein the measuring means measures a change in a ratio of the pulse durations of two successive opposite polarity pulses of the picked-up signal.

3. A track jump control apparatus as recited in claim 1 or 2, wherein the measuring means measures the pulse durations of the picked-up signal by use of a reference clock that has a constant pulse frequency.

4. A track jump control apparatus as recited in claim 1 or 2, wherein the measuring means measures a time interval of the pulse of the picked-up signal.

5. A track jump control apparatus as recited in claim 1, wherein the detecting means detects the direction in which the pickup element is moving by determining a relative phase shift direction between a first rectangular pulse train signal developed by shaping the envelope of an RF signal obtained by the pickup element and a second rectangular pulse train signal obtained from a tracking error signal.

6. A disc reproducing system including:
 a transport unit constructed and arranged to transport, in the radial direction of a disc, a pickup element that reads data that has been recorded on the disc;
 a detection unit constructed and arranged to detect, based on a picked-up signal output from the pickup element, a direction in which the pickup element is moving; and
 a protection unit constructed and arranged to perform an operation that causes the movement of the pickup element to stop when it is determined that the direction of movement of the pickup element is opposite to an expected moving direction, wherein the protection unit includes:
   a measuring unit constructed and arranged to successively measure pulse durations of the picked-up signal, and
   a control unit, which is responsive to the measured result of the measuring unit, constructed and arranged to prevent the protection unit from causing the movement of the pickup element to stop when the ratio of pulse durations of two successive opposite polarity output signals has varied from a prescribed range.

7. A disc reproducing system according to claim 6 wherein the protection unit further includes a determination unit for determining when the direction of movement of the pickup element is opposite to the expected moving direction.

8. A disc reproducing system according to claim 6 wherein the protection unit further includes a plurality of delay type flip flops.

9. A disc reproducing system according claim 8 wherein the protection unit further includes a counter, and the control unit includes a switch and an inverter.

* * * * *